(12) United States Patent
Yano

(10) Patent No.: US 10,339,427 B2
(45) Date of Patent: Jul. 2, 2019

(54) SUBJECT EVALUATION SYSTEM, SUBJECT EVALUATION METHOD AND RECORDING MEDIUM STORING SUBJECT EVALUATION PROGRAM

(71) Applicant: FUJIFILM Corporation, Tokyo (JP)

(72) Inventor: Hironori Yano, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

(21) Appl. No.: 15/180,340

(22) Filed: Jun. 13, 2016

(65) Prior Publication Data

US 2017/0091594 A1 Mar. 30, 2017

(30) Foreign Application Priority Data

Sep. 29, 2015 (JP) ................................. 2015-191314

(51) Int. Cl.
| | |
|---|---|
| G06K 9/00 | (2006.01) |
| G06K 9/46 | (2006.01) |
| G06K 9/62 | (2006.01) |

(52) U.S. Cl.
CPC ....... *G06K 9/6285* (2013.01); *G06K 9/00677* (2013.01); *G06K 9/4652* (2013.01);
(Continued)

(58) Field of Classification Search
CPC ............ G06F 17/30259; G06K 9/6285; G06K 9/4661; G06K 9/6215; G06K 9/4652; G06K 9/00677; G06K 9/6296
(Continued)

(56) References Cited

U.S. PATENT DOCUMENTS

| | | | |
|---|---|---|---|
| 6,282,317 B1 * | 8/2001 | Luo .................... | G06K 9/00234 |
| | | | 382/203 |
| 7,254,285 B1 * | 8/2007 | Paek ................... | G06K 9/4685 |
| | | | 358/453 |

(Continued)

FOREIGN PATENT DOCUMENTS

| | | |
|---|---|---|
| JP | 2011-070277 A | 4/2011 |
| JP | 2012-032728 A | 2/2012 |
| JP | 5307873 B2 | 10/2013 |

OTHER PUBLICATIONS

Luo, Jiebo, and Amit Singhal. "On measuring low-level self and relative saliency in photographic images." Pattern Recognition Letters 22.2 (2001): 157-169.*

*Primary Examiner* — Geoffrey E Summers
(74) *Attorney, Agent, or Firm* — Studebaker & Brackett PC

(57) ABSTRACT

A principal-subordinate relationship between two subjects is decided with regard to multiple subjects included in an image. Similarly, with regard also to other images, a principal-subordinate relationship between two subjects is decided with regard to multiple subjects included in each image. In a case where a relationship exists in which a first subject is a subordinate subject and a second subject is principal subject, the system calculates a principal-subordinate relationship value that is higher than in a case where a relationship in which a first subject is a subordinate subject and a second subject is principal subject does not exist. The greater the number of subjects to which the first subject is subordinate from among the multiple subjects, the lower the principal-subordinate relationship value calculated. On the basis of the calculated principal-subordinate relationship values, a subject evaluation value is calculated for every subject.

14 Claims, 12 Drawing Sheets

(52) U.S. Cl.
CPC ......... *G06K 9/4661* (2013.01); *G06K 9/6215* (2013.01); *G06K 9/6296* (2013.01)

(58) Field of Classification Search
USPC ........................................................ 382/305
See application file for complete search history.

(56) References Cited

U.S. PATENT DOCUMENTS

| | | | | |
|---|---|---|---|---|
| 2009/0324063 | A1* | 12/2009 | Murase | G06K 9/0061 |
| | | | | 382/163 |
| 2010/0142762 | A1* | 6/2010 | Morita | G06F 17/30259 |
| | | | | 382/115 |
| 2012/0148165 | A1* | 6/2012 | Yabu | G06F 17/30247 |
| | | | | 382/225 |
| 2012/0206619 | A1* | 8/2012 | Nitta | H04N 5/23219 |
| | | | | 348/222.1 |
| 2013/0251201 | A1* | 9/2013 | Zhou | G06K 9/00228 |
| | | | | 382/103 |
| 2014/0126826 | A1* | 5/2014 | Yabu | G06Q 30/06 |
| | | | | 382/190 |
| 2016/0196284 | A1* | 7/2016 | Kanda | G06F 17/30277 |
| | | | | 707/724 |

\* cited by examiner

| SUBORDINATE | PRINCIPAL |
|---|---|
| FLOWER 25 | MOTHER 23 |
| FLOWER 25 | GIRL 21 |
| FLOWER 25 | BOY 22 |
| FLOWER 25 | FATHER 24 |
| MOTHER 23 | GIRL 21 |
| FATHER 24 | BOY 22 |

| IMAGE | PRINCIPAL-SUBORDINATE RELATIONSHIP | |
|---|---|---|
| | SUBORDINATE | PRINCIPAL |
| IMAGE 20 | FLOWER 25 | MOTHER 23 |
| | FLOWER 25 | GIRL 21 |
| | FLOWER 25 | BOY 22 |
| | FLOWER 25 | FATHER 24 |
| | MOTHER 23 | GIRL 21 |
| | FATHER 24 | BOY 22 |
| IMAGE 50 | MOTHER 23 | GIRL 21 |
| | BUS 27 | MAN 26 |
| | MAN 26 | FATHER 24 |
| | BUS 27 | FATHER 24 |
| | BUS 27 | BOY 22 |
| | MAN 26 | BOY 22 |
| | FATHER 24 | MOTHER 23 |
| | FATHER 24 | BOY 22 |

Fig. 10

$$L = \begin{pmatrix} 0 & 0 & 0.166 & 0 & 0.166 & 0 & 0 \\ 0.25 & 0 & 0.166 & 0.5 & 0.166 & 0 & 0 \\ 0.25 & 1 & 0 & 0 & 0.166 & 0 & 0 \\ 0.25 & 0 & 0.166 & 0 & 0.166 & 0.333 & 0.5 \\ 0.25 & 0 & 0.166 & 0.5 & 0 & 0.333 & 0.5 \\ 0 & 0 & 0.166 & 0 & 0.166 & 0 & 0 \\ 0 & 0 & 0.166 & 0 & 0.166 & 0.333 & 0 \end{pmatrix}$$

Fig. 11

$$A = \begin{pmatrix} 1/7 & 1/7 & 1/7 & 1/7 & 1/7 & 1/7 & 1/7 \\ 1/7 & 1/7 & 1/7 & 1/7 & 1/7 & 1/7 & 1/7 \\ 1/7 & 1/7 & 1/7 & 1/7 & 1/7 & 1/7 & 1/7 \\ 1/7 & 1/7 & 1/7 & 1/7 & 1/7 & 1/7 & 1/7 \\ 1/7 & 1/7 & 1/7 & 1/7 & 1/7 & 1/7 & 1/7 \\ 1/7 & 1/7 & 1/7 & 1/7 & 1/7 & 1/7 & 1/7 \\ 1/7 & 1/7 & 1/7 & 1/7 & 1/7 & 1/7 & 1/7 \end{pmatrix}$$

Fig. 12

$$G = \begin{pmatrix} 0.021 & 0.021 & 0.163 & 0.021 & 0.163 & 0.021 & 0.021 \\ 0.234 & 0.021 & 0.163 & 0.446 & 0.163 & 0.021 & 0.021 \\ 0.234 & 0.871 & 0.021 & 0.021 & 0.163 & 0.021 & 0.021 \\ 0.234 & 0.021 & 0.163 & 0.021 & 0.163 & 0.302 & 0.446 \\ 0.234 & 0.021 & 0.163 & 0.446 & 0.021 & 0.302 & 0.446 \\ 0.021 & 0.021 & 0.163 & 0.021 & 0.163 & 0.021 & 0.021 \\ 0.021 & 0.021 & 0.163 & 0.021 & 0.163 & 0.302 & 0.021 \end{pmatrix}$$

Fig. 13

| SUBJECT | SUBJECT EVALUATION VALUE |
|---|---|
| FLOWER 25 | 0.0796 |
| MOTHER 23 | 0.1655 |
| GIRL 21 | 0.2078 |
| FATHER 24 | 0.1625 |
| BOY 22 | 0.2028 |
| BUS 27 | 0.0796 |
| MAN 26 | 0.1021 |

$$L = \begin{pmatrix} 0 & 0 & 0.166 & 0 & 0.166 & 0 & 0 \\ 0.25 & 0 & 0.166 & 0.333 & 0.166 & 0 & 0 \\ 0.25 & 1 & 0 & 0 & 0.166 & 0 & 0 \\ 0.25 & 0 & 0.166 & 0 & 0.166 & 0.333 & 0.5 \\ 0.25 & 0 & 0.166 & 0.666 & 0 & 0.333 & 0.5 \\ 0 & 0 & 0.166 & 0 & 0.166 & 0 & 0 \\ 0 & 0 & 0.166 & 0 & 0.166 & 0.333 & 0 \end{pmatrix}$$

Fig. 16

$$G = \begin{pmatrix} 0.021 & 0.021 & 0.163 & 0.021 & 0.163 & 0.021 & 0.021 \\ 0.234 & 0.021 & 0.163 & 0.305 & 0.163 & 0.021 & 0.021 \\ 0.234 & 0.871 & 0.021 & 0.021 & 0.163 & 0.021 & 0.021 \\ 0.234 & 0.021 & 0.163 & 0.021 & 0.163 & 0.302 & 0.446 \\ 0.234 & 0.021 & 0.163 & 0.588 & 0.021 & 0.302 & 0.446 \\ 0.021 & 0.021 & 0.163 & 0.021 & 0.163 & 0.021 & 0.021 \\ 0.021 & 0.021 & 0.163 & 0.021 & 0.163 & 0.302 & 0.021 \end{pmatrix}$$

Fig. 17

| SUBJECT | SUBJECT EVALUATION VALUE |
|---|---|
| FLOWER 25 | 0.0812 |
| MOTHER 23 | 0.1454 |
| GIRL 21 | 0.1946 |
| FATHER 24 | 0.1657 |
| BOY 22 | 0.2275 |
| BUS 27 | 0.0812 |
| MAN 26 | 0.1042 |

Fig. 18

| SUBJECT | SUBJECT EVALUATION VALUE | RARITY EVALUATION VALUE |
|---|---|---|
| GIRL 21 | 0.154623 | 0.003596 |
| BOY 22 | 0.148771 | 0.003234 |
| MOTHER 23 | 0.118378 | 0.002819 |
| FATHER 24 | 0.090929 | 0.002526 |
| FLOWER 25 | 0.07569 | 0.005046 |
| BOOK | 0.060118 | 0.015029 |
| BOAT | 0.060118 | 0.00668 |
| OBJECT | 0.051184 | 0.010237 |
| FOOD | 0.045887 | 0.022944 |
| PLANT | 0.037388 | 0.001869 |
| DRINK | 0.031837 | 0.010612 |
| ... | ... | ... |

# SUBJECT EVALUATION SYSTEM, SUBJECT EVALUATION METHOD AND RECORDING MEDIUM STORING SUBJECT EVALUATION PROGRAM

CROSS-REFERENCE TO RELATED APPLICATIONS

The present invention claims priority under 35 U.S.C § 119 to Japanese Patent Application No. 2015-191314 filed Sep. 29, 2015. Each of the above application(s) is hereby expressly incorporated by reference, in its entirety, into the present application.

BACKGROUND OF THE INVENTION

Field of the Invention

This invention relates to a subject evaluation apparatus, subject evaluation method and recording medium storing a subject evaluation program.

Description of the Related Art

Since it has become easy to take pictures using a digital camera, the user of such a camera will possess a large number of images. For this reason, finding important images from among a large number thereof has been contemplated (Patent Document 1). Further, there is a system for deciding the relationship between subjects included in an image (Patent Document 2) and a system for determining how the subjects included in an image are related (Patent Document 3).

Patent Document 1: Japanese Patent No. 5307873
Patent Document 2: Japanese Patent Application Laid-Open No. 2012-32728
Patent Document 3: Japanese Patent Application Laid-Open No. 2011-70277

Patent Document 1 finds important images from among a large number thereof; it does not consider the calculation of an evaluation value of a subject, which is included in an image, taking into account the actual importance of the subject. Further, according to Patent Document 2, images to be displayed are decided based upon the relationships of subjects, and Patent Document 3 determines what a relationship is; neither considers the calculation of evaluation values of subjects, which are included in a plurality of images, taking into account the actual importance of the subjects.

SUMMARY OF THE INVENTION

An object of the present invention is to calculate subject evaluation values in such a manner that the evaluation value of a subject thought to actually be important will rise.

A subject evaluation system according to the present invention comprises: a principal-subordinate relationship decision unit (principal-subordinate relationship decision means) for executing principal-subordinate relationship decision processing with regard to multiple images, wherein the principal-subordinate relationship decision processing decides a principal-subordinate relationship, which concerns two images, with regard to multiple subjects included in each image; a principal-subordinate relationship value calculation unit (principal-subordinate relationship value calculation means) which, based upon the principal-subordinate relationships decided with regard to the multiple images, and in a case where a relationship in which a first subject is a subordinate subject and a second subject is a principal subject exists, is for applying a principal-subordinate relationship value, which is higher than in a case where a relationship in which the first subject is a subordinate subject and the second subject is a principal subject does not exist, to a principal-subordinate relationship in which the first subject is a subordinate subject and the second subject is a principal subject, and in a case where a relationship in which the first subject is a subordinate subject and the second subject is a principal subject exists, is for applying a principal-subordinate relationship value, which is lower the greater the number of subjects to which the first subject is subordinate from among the multiple subjects, to a principal-subordinate relationship in which the first subject is a subordinate subject and the second subject is a principal subject; and a subject evaluation value calculation unit (subject evaluation value calculation means) for calculating a subject evaluation value for every one of the subjects based upon the principal-subordinate relationship value calculated by the principal-subordinate relationship value calculation unit.

The present invention provides also a subject evaluation method. Specifically, the method comprises the steps of: a principal-subordinate relationship decision unit executing principal-subordinate relationship decision processing with regard to multiple images, wherein the principal-subordinate relationship decision processing decides a principal-subordinate relationship, which concerns two images, with regard to multiple subjects included in each image; based upon the principal-subordinate relationships decided with regard to the multiple images, a principal-subordinate relationship value calculation unit applying, in a case where a relationship in which a first subject is a subordinate subject and a second subject is a principal subject exists, a principal-subordinate relationship value, which is higher than in a case where a relationship in which the first subject is a subordinate subject and the second subject is a principal subject does not exist, to a principal-subordinate relationship in which the first subject is a subordinate subject and the second subject is a principal subject, and in a case where a relationship in which the first subject is a subordinate subject and the second subject is a principal subject exists, applying a principal-subordinate relationship value, which is lower the greater the number of subjects to which the first subject is subordinate from among the multiple subjects, to a principal-subordinate relationship in which the first subject is a subordinate subject and the second subject is a principal subject; and a subject evaluation value calculation unit calculating a subject evaluation value for every one of the subjects based upon the principal-subordinate relationship value calculated by the principal-subordinate relationship value calculation unit.

The present invention further provides a recording medium storing a subject evaluation program.

By way of example, in a case where a relationship in which the first subject is a subordinate subject and the second subject is a principal subject exists, the principal-subordinate relationship value calculation unit calculates the principal-subordinate relationship value as a reciprocal of the number of the subjects to which the first subject is subordinate, and in a case where a relationship in which the first subject is a subordinate subject and the second subject is a principal subject does not exist, the principal-subordinate relationship value calculation unit calculates the principal-subordinate relationship value as being zero.

For example, in a case where two subjects overlap, the principal-subordinate relationship decision processing in the principal-subordinate relationship decision unit adopts whichever subject is in front as a principal subject and whichever subject is in back as a subordinate subject.

In a case where two subjects are spaced away from each other, the principal-subordinate relationship decision processing in the principal-subordinate relationship decision unit need not decide a principal-subordinate relationship.

The principal-subordinate relationship decision processing in the principal-subordinate relationship decision unit may assume that of two subjects, a subject relatively close to the center of the image is a principal subject and a subject relatively far from the center of the image is a subordinate subject, and may assume that, of two subjects, a subject having a relatively high saturation, lightness or image quality is a principal subject and a subject having a relatively low saturation, lightness or image quality is a subordinate subject.

The subject evaluation value calculation unit may be adapted in such a manner that the greater the number of images having a principal-subordinate relationship in which the first subject is a subordinate subject and the second subject is a principal subject, the higher principal-subordinate relationship value applied to a principal-subordinate relationship in which the first subject is a subordinate subject and the second subject is a principal subject.

The system may further comprise a subject rarity calculation unit (subject rarity calculation means) for calculating subject rarities obtained by dividing the subject evaluation values, which have been calculated by the subject evaluation value calculation unit, by respective ones of frequencies of appearance of subjects in the multiple images.

By way of a example, the subjects are decided from tags that have been appended to the images.

In accordance with the present invention, principal-subordinate relationship decision processing for deciding a principal-subordinate relationship concerning two subjects is executed with regard to multiple images. On the basis of the principal-subordinate relationships decided with regard to the multiple images, a principal-subordinate relationship value, which value is higher in a case where a relationship in which a first subject is a subordinate subject and a second subject is a principal subject exists than in a case where a relationship in which the first subject is a subordinate subject and the second subject is a principal subject does not exist, is applied to a principal-subordinate relationship in which the first subject is a subordinate subject and the second subject is a principal, subject. A subject evaluation value is calculated based upon the principal-subordinate relationship value. The more a subject is a principal subject, the more important the subject is considered to be, and the more important the subject, the higher the subject evaluation value. Furthermore, in a case where a relationship in which the first subject is a subordinate subject and the second subject is a principal subject exists, a principal-subordinate relationship value that is lower the greater the number of subjects to which the first subject is a subordinate subject among the multiple subjects is applied to a principal-subordinate relationship in which the first subject is a subordinate subject and the second subject is a principal subject. In a case where the number of subjects to which the first subject is a subordinate subject is large in a principal-subordinate relationship in which the first subject is a subordinate subject and the second subject is a principal subject, it is construed that the first subject is not very important. Accordingly, a low principal-subordinate relationship value is applied in a principal-subordinate relationship in which the first subject is a subordinate subject and the second subject is a principal subject, and the subject evaluation value of the first subject is lowered as well. In this way it is possible to calculate a subject evaluation value in which the evaluation value of a subject thought to actually be important will rise.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is an example of a link matrix;

FIG. 11 is an example of a matrix used in calculating a subject evaluation value matrix;

FIG. 12 is an example of a subject evaluation value matrix;

FIG. 13 is an example of a subject evaluation value table;

FIG. 16 is an example of a subject evaluation value matrix; and

FIGS. 17 and 18 are examples of subject evaluation value tables.

DESCRIPTION OF THE PREFERRED EMBODIMENT

A preferred embodiment of the present invention will now be described in detail with reference to the accompanying drawings.

Figure 1:
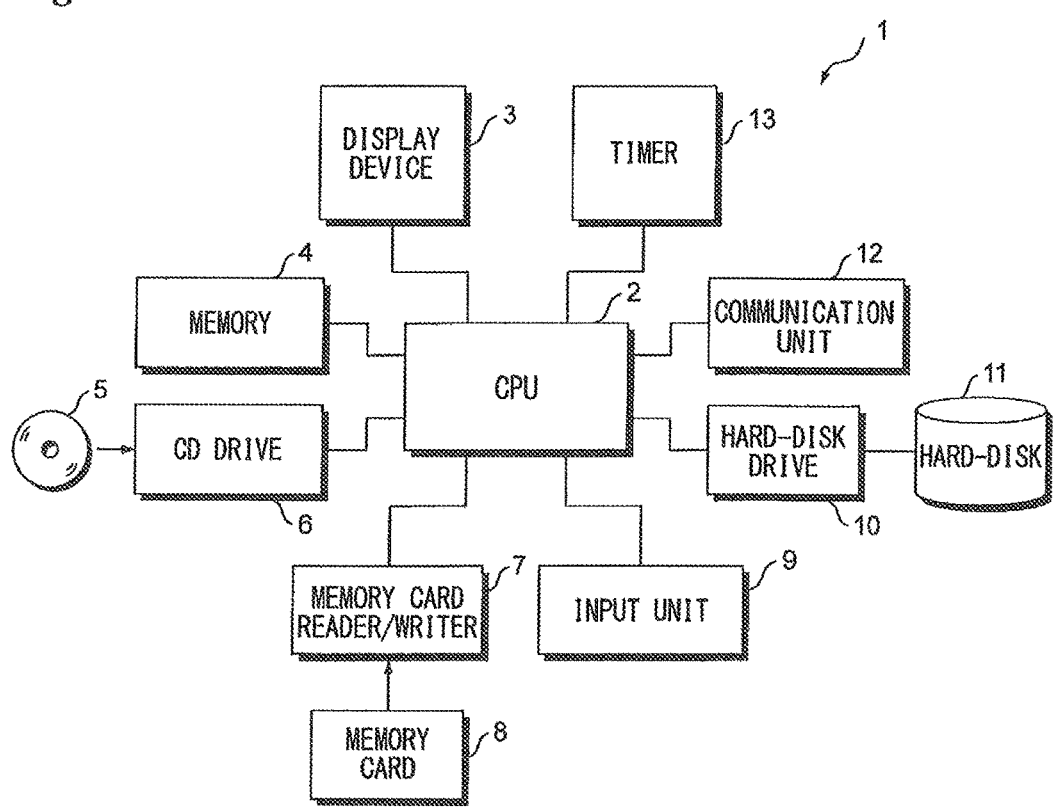
FIG. 1 is a block diagram illustrating the electrical configuration of a subject evaluation system.

FIG. 1 illustrates an embodiment of the present invention and is a block diagram showing the electrical configuration of a subject evaluation system 1. The subject evaluation system 1 calculates evaluation values of multiple subjects included in one image or in multiple images.

The overall operation of the subject evaluation system 1 is controlled by a CPU (Central Processing Unit) 2.

The subject evaluation system 1 includes a display device 3 for displaying images on a display screen, a memory 4 storing data and the like, and a CD (Compact Disc) drive 6 for accessing data and the like recorded on the compact disc 5. The subject evaluation system 1 further includes a memory card reader/writer 7 for reading an image file from a memory card 8, which stores image files representing images, and recording the image file on the memory card 8, and an input unit 9 for applying various commands to the subject evaluation system 1. The subject evaluation system 1 further includes a hard disk 11, a hard-disk drive 10 for accessing the hard disk 11, a communication unit 12 for communicating with another computer or the like, and a timer 13.

When the memory card 8 is loaded in the image evaluation system 1 and multiple image files are read by the memory card reader/writer 7, multiple subjects are detected from within each of the multiple images represented by the multiple image files that have been read. A subject evaluation value is calculated for every subject of the multiple subjects detected. In a case where image files have been stored not on the memory card 8 but on the compact disc 5 or on some other medium, the image files that have been stored on the disk or other medium are read and subject evaluation values are calculated with regard to the subjects included in the images represented by the image files. The image evaluation system 1 would be provided with a reading device suitable for reading image files stored on media. Further, in a case where an image file is applied to the subject evaluation system 1 via a network such as the Internet, the image file is received by the communication unit 12 and the received image file is applied to and stored in the memory 4. A subject evaluation value is calculated with regard to a subject included in the image represented by the image file thus stored.

The compact disc 5 (recording medium) contains a program readable by the CPU 2 (computer) of the subject evaluation system 1 for controlling processing described later. By loading the compact disc 5 in the image evaluation system 1, the program stored on the compact disc 5 is installed in the subject evaluation system 1. The program may be transmitted to the image evaluation system 1 via a network such as the Internet. The program is received by the communication unit 12 and the received program is installed in the subject evaluation system 1.

Figure 2:
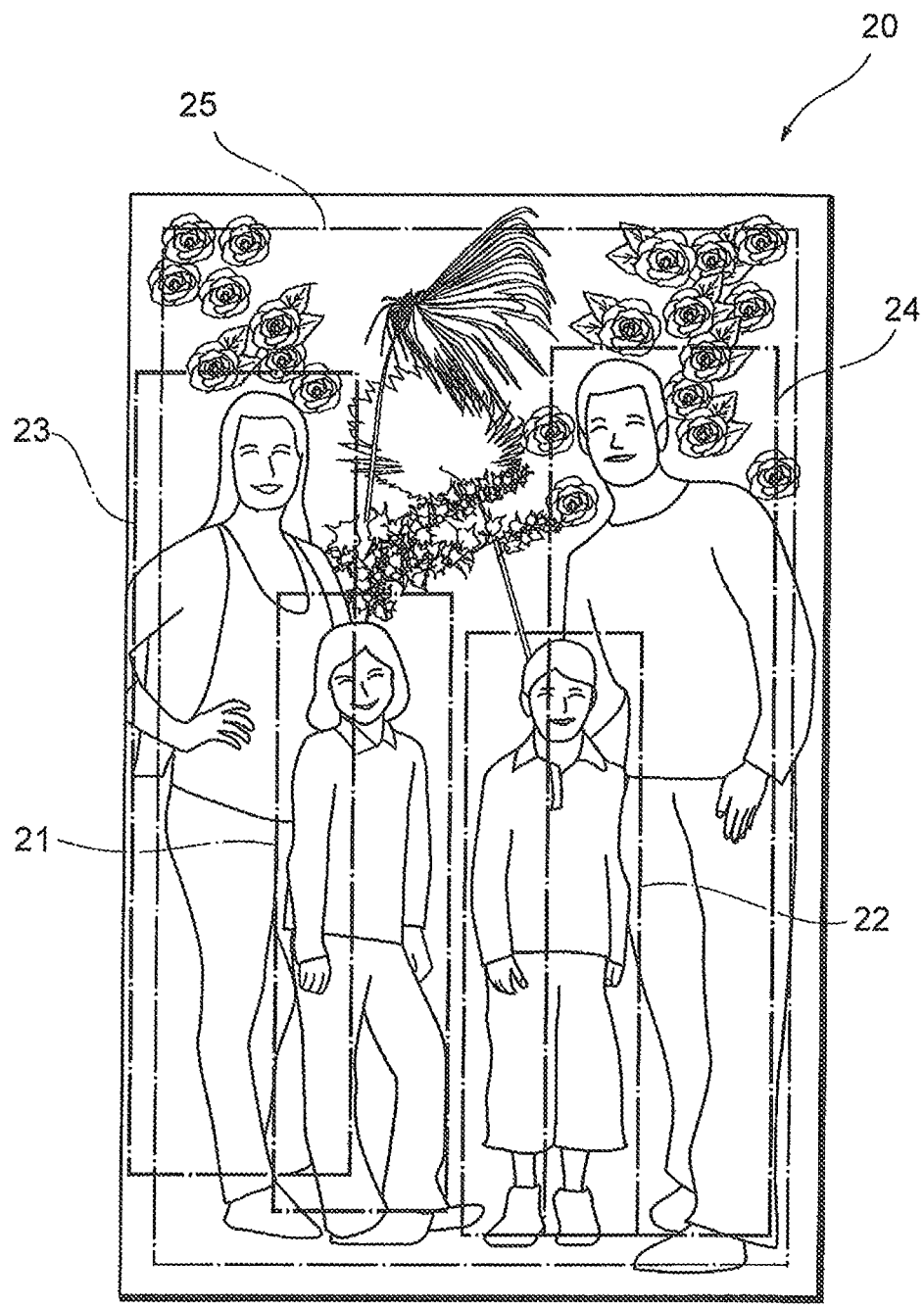
FIG. 2 is an example of an image.

FIG. 2 is an example of an image 20.

The image 20 includes subjects, namely a girl 21, a boy 22, a mother 23, a father 24 and flowers 25. The subjects, namely the girl 21, boy 22, mother 23, father 24 and flowers 25, are each detected by the CPU 2.

In order to calculate subject evaluation values in this embodiment, principal-subordinate relationship processing is executed for deciding a principal-subordinate relationship, which concerns two subjects, with regard to multiple subjects included in an image. This processing is executed with regard to multiple images. In a case where the two subjects overlap each other, the CPU 2 (a principal-subordinate relationship decision unit) assumes that the subject present in front is a "principal" subject and that the subject present in back is a "subordinate" subject. In a case where the two subjects do not overlap, no principal-subordinate relationship involving the two subjects is decided.

The image of the girl 21, who is a subject, has been captured in front of the image of the mother 23, who is a subject. Accordingly, the principal-subordinate relationship involving the girl 21 and the mother 23 is such that the girl 21 is a "principal" and the mother 23 a "subordinate". Further, the image of the boy 22, who is a subject, has been captured in front of the image of the father 24, who is a subject. Accordingly, the principal-subordinate relationship involving the boy 22 and the father 24 is such that the boy 22 is a "principal" and the father 24 a "subordinate". Furthermore, the images of the flowers 25, which are subjects, have been captured in back of the images of all of the subjects, namely the girl 21, boy 22, mother 23 and father 24. Accordingly, the principal-subordinate relationships between the flowers 25 and the respective subjects that are the girl 21, boy 22, mother 23 and father 24 are such that the flowers are all "subordinate" and the girl 21, boy 22, mother 23 and father 24 are all "principal". Furthermore, since the girl 21 and the boy 22 do not overlap each other, no principal-subordinate relationship is decided between them. Similarly, since the mother 23 and the father 24 do not overlap each other, no principal-subordinate relationship is decided between them.

The decision regarding the principal-subordinate relationship between two subjects may adopt the subject that is relatively close to the center of the image as the H"principal" and the subject that is relative far from the center of the image as the "subordinate". Further, the decision regarding the principal-subordinate relationship between two subjects may adopt the subject having a relatively high saturation, lightness or image quality as the "principal" and the subject having a relatively low saturation, lightness or image quality as the "subordinate". Furthermore, a principal-subordinate relationship between two subjects may be decided even in a case where the two subjects do not overlap each other. It may be arranged to execute a plurality of types of principal-subordinate relationship decision processing such as principal-subordinate relationship decision processing that is based upon whether subjects overlap and principal-subordinate relationship decision processing that is based upon whether a subject is relatively close to the center of the image. In a case where a plurality of types of principal-subordinate relationship decision processing are executed, a subject evaluation value, described later, is obtained for every type of principal-subordinate relationship decision processing, and the subject evaluation values obtained for every one of these types of principal-subordinate relationship decision processing are summed, for example, per subject, whereby there is obtained a final subject evaluation value.

Figures 3, 4:
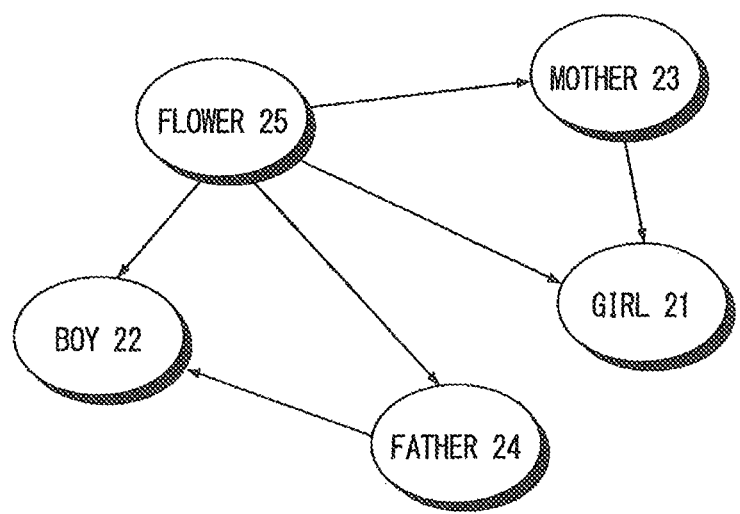
FIG. 3 is an example of a principal-subordinate relationship table.
FIG. 4 is an example of a directed graph.

FIG. 3 is a principal-subordinate relationship table illustrating principal-subordinate relationships that have been decided. The principal-subordinate relationship table shown in FIG. 3 pertains to the image 20 and is generated with regard to other images as well.

By virtue of principal-subordinate relationship decision processing applied to the flowers 25 and the mother 23, it is decided that the flowers 25 is "subordinate" and that the mother 23 is "principal" and this relationship is stored in the principal-subordinate relationship table. Similarly, between the flowers 25 and the girl 21, it is decided that the flowers 25 is "subordinate" and that the girl 21 is "principal"; between the flowers 25 and the boy 22, it is decided that the flowers 25 is "subordinate" and that the boy 22 is "principal"; and between the flowers 25 and the father 24, it is decided that the flowers 25 is "subordinate" and that the father 24 is "principal" Further, between the mother 23 and the girl 21, it is decided that the mother 23 is "subordinate" and that the girl 21 is "principal", and between the father 24 and the boy 22, it is decided that the father 24 is "subordinate" and that the boy 22 is "principal". Data representing such principal-subordinate relationships has been stored in the principal-subordinate relationship table. Although the principal-subordinate relationship table is stored in the memory 4 in association with the image 20, the table may just as well be stored in the header of the image file representing the image 20.

FIG. 4 is a directed graph involving the girl 21, the boy 22, the mother 23, the father 24 and the flowers 25, which are subjects included in the image 20.

The directed graph shows an arrow pointing from a subject decided on as "subordinate" to a subject decided on as "principal". For example, since the flowers 25 is "subordinate" in all of its principal-subordinate relationships with the girl 21, the boy 22, the mother 23 and the father 24, arrows point from the flowers 25 to all of the subjects the girl 21, the boy 22, the mother 23 and the father 24. Similarly, since the mother 23 is "subordinate" in its principal-subordinate relationship with the girl 21, an arrow points from the mother 23 to the girl 21. Furthermore, since the father 24 is "subordinate" in its principal-subordinate relationship with the boy 22, an arrow points from the father 24 to the boy 22. The principal-subordinate relationship between two subjects can be ascertained at a glance from the directed graph.

By utilizing this approach, this embodiment is such that subject evaluation values are calculated with regard to respective ones of subjects of multiple subjects included in multiple images. It should be noted that, in this embodiment, though there is an image in which the father 24 is the subordinate subject and the boy 22 the principal subject, there is no image in which the boy 22 is the subordinate subject and the father 24 the principal subject. However, depending upon the contents of multiple images, there are also cases where there are images in which the father 24 is the subordinate subject and the boy 22 the principal subject, and there are other images in which the boy 22 is the subordinate subject and the father 24 the principal subject. In such cases, both an arrow pointing from the father 24 to the boy 22 and an arrow pointing from the boy 22 to the father 24 will exist in the directed graph.

Figure 5:
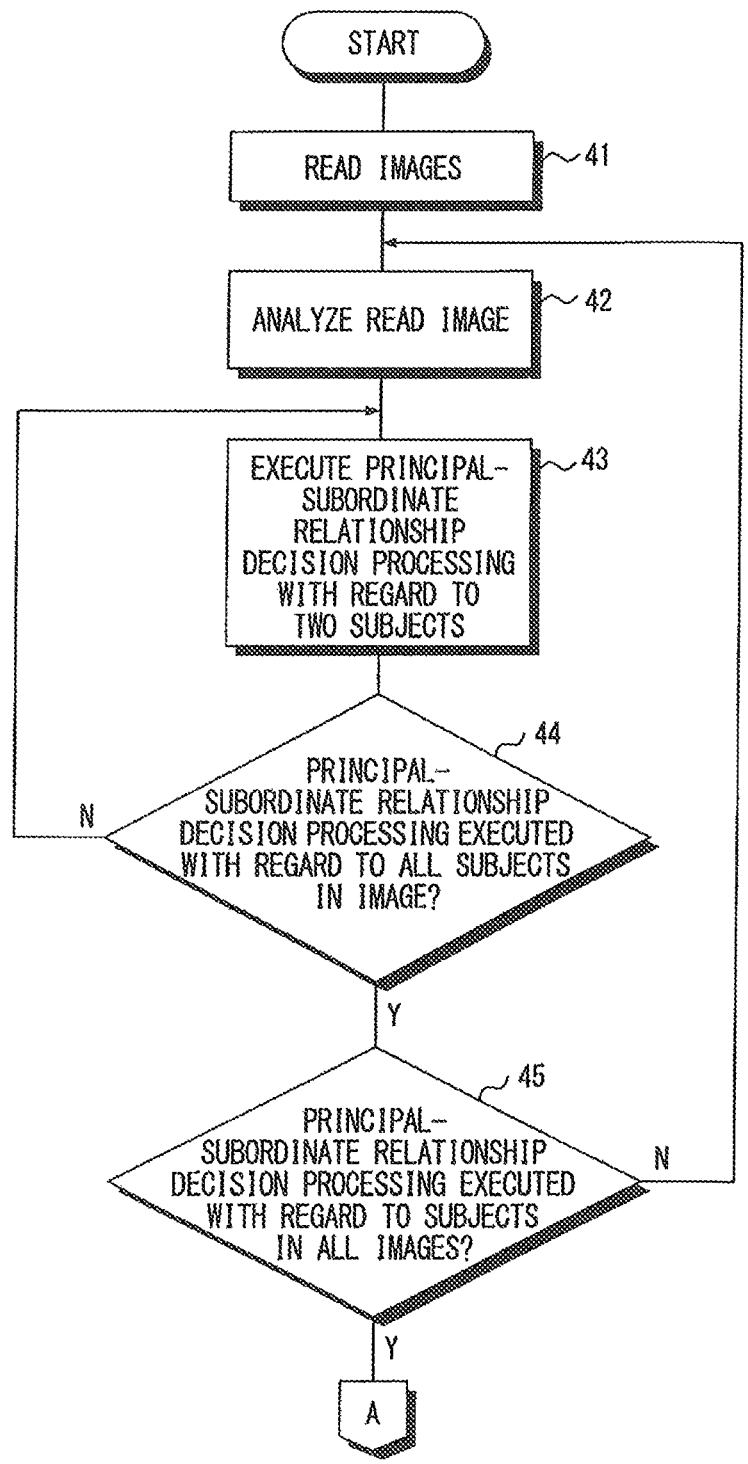
FIGS. 5 and 6 are flowcharts illustrating processing executed by a subject evaluation system.
Figure 6:
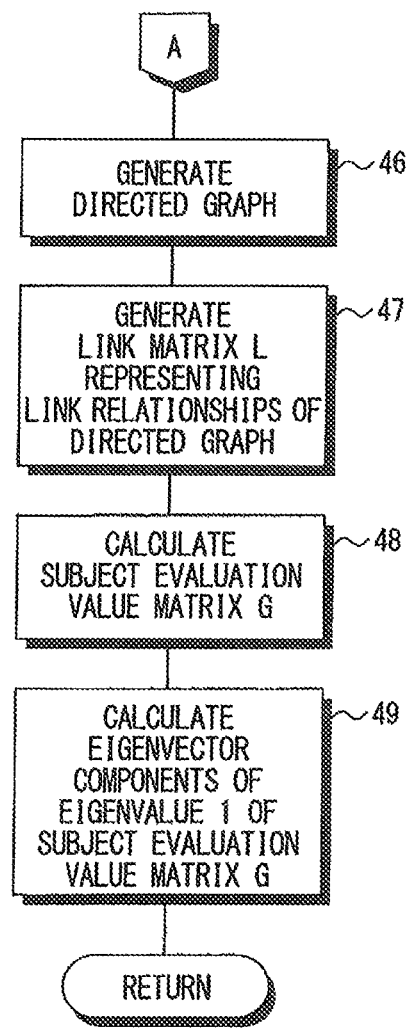
Figure 7:
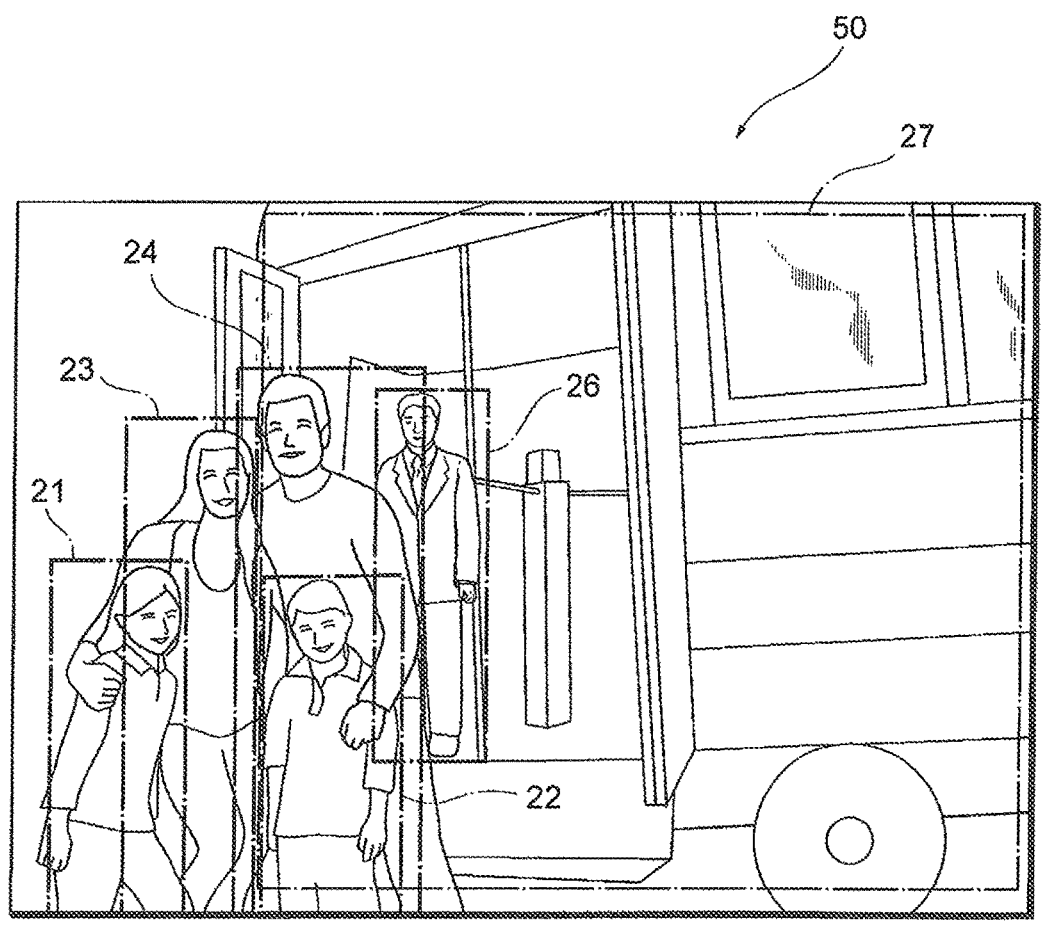
FIG. 7 is an example of an image.

FIGS. 5 to 6 are flowcharts illustrating processing executed by the subject evaluation system 1. FIG. 7 is an example of an image 50. Processing will be described with regard to a case where subject evaluation values are calculated of respective ones of subjects of multiple subjects included in multiple images 20 and 50, namely the image 20 shown in FIG. 2 and the image 50 shown in FIG. 7. Subject evaluation values are calculated in similar fashion with regard not only to two images but with regard to three or more images as well.

Image files representing the images 20 and 50 have been stored in the memory card 8, and the image files representing the images 20 and 50 are read from the memory card 8 by the memory card reader/writer 7 (step 41). The read files are stored in the memory 4 temporarily.

First, the image 20 is analyzed by the CPU 2 (step 42). The subjects in the image 20 are detected from the image 20 by image analysis, and the CPU 2 (principal-subordinate relationship decision unit) executes processing for deciding the principal-subordinate relationship between two subjects among the subjects included in the image 20 (step 43). It may be arranged so that, in a case where tag information indicating the types and positions, etc., of subjects has been stored in the header of the image file, the types and positions, etc., of the subjects are detected from the tag information without detecting the subjects by image analysis. The principal-subordinate relationship decision processing is repeated until this processing is executed with regard to all pairs of subjects included in the image (step 44). By executing such principal-subordinate relationship processing, principal-subordinate relationships are obtained, as described above, with regard to all combinations found when two people have been selected from along the girl 21, boy 22, mother 23 and father 24 included in the image 20.

Figures 8, 9:
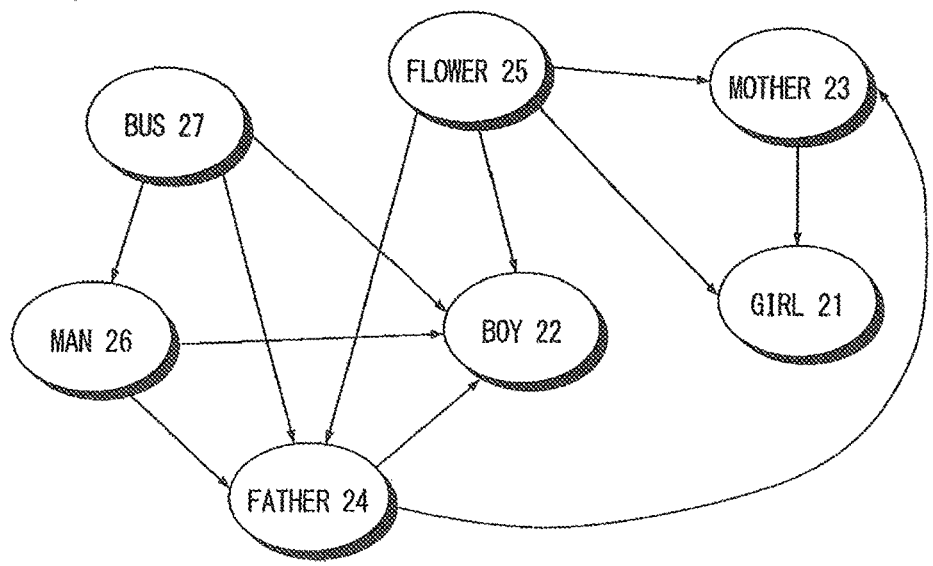
FIG. 8 is an example of a principal-subordinate relationship table.
FIG. 9 is an example of a directed graph.

FIG. 8 is an example of a principal-subordinate relationship table.

The principal-subordinate relationship table contains, per image, principal-subordinate relationships between pairs of subjects among the subjects included in each image. As described above, the principal-subordinate relationship between the flowers 25 and the mother 23 in the image 20 is such that the flowers 25 has been decided on as "subordinate" and the mother 23 as "principal", and this principal-subordinate relationship has been stored in the principal-subordinate relationship table. Similarly, the principal-subordinate relationship between the flowers 25 and the girl 21 is such that the flowers 25 has been decided on as "subordinate" and the girl 21 as "principal", the principal-subordinate relationship between the flowers 25 and the boy 22 is such that the flowers 25 has been decided on as "subordinate" and the boy 22 as "principal", and the principal-subordinate relationship between the flowers 25 and the father 24 is such that the flowers 25 has been decided on as "subordinate" and the father 24 as "principal". Further, the principal-subordinate relationship between the mother 23 and the girl 21 is such that the mother 23 has been decided on as "subordinate" and the girl 21 as "principal", and the principal-subordinate relationship between the father 24 and the boy 22 is such that the father 24 has been decided on as "subordinate" and the boy 22 as "principal".

When processing for deciding the principal-subordinate relationships between the subjects in the image 20 is finished, it is determined whether processing for deciding the principal-subordinate relationships between the subjects in the remaining images has been executed (step 45). If processing for deciding the principal-subordinate relationships between the subjects in the image 50 shown in FIG. 7 has not been executed ("NO" at step 45), the image 50 is subjected to image analysis (step 42), the subjects are detected from the image 50 and principal-subordinate relationship processing is executed with regard to the subjects included in the image 50 (step 43).

With reference to FIG. 7', the image 50 is analyzed by the CPU 2 and it is detected that the image 50 includes subjects, namely the girl 21, boy 22, mother 23, father 24, a man 26 and a bus 27. Subject recognition processing is executed by the CPU 2, whereby it is recognized that the girl 21 included in the image 20 and the girl 21 included in the image 50 are the same individual. Similarly, it is recognized that the boy 22 included in the image 20 and the boy 22 included in the image 50 are the same individual, that the mother 23 included in the image 20 and the mother 23 included in the image 50 are the same individual, and that the father 24 included in the image 20 and the father 24 included in the image 50 are the same individual.

The CPU 2 executes processing for deciding the principal-subordinate relationships between pairs of subjects among the subjects, namely the girl 21, boy 22, mother 23, father 24, man 26 and bus 27, included in the image 50 (step 43).

Since the girl 21 is in front of and overlaps the mother 23 in the image 50, the principal-subordinate relationship between the girl 21 and the mother 23 is such that the girl 21 is "principal" and the mother 23 is "subordinate". Since the boy 22 is in front of and overlaps the father 24 in the image 50, the principal-subordinate relationship between the boy 22 and the father 24 is such that the boy 22 is "principal" and the father 24 is "subordinate". Further, since the mother 23 is in front of and overlaps the father 24, the principal-subordinate relationship between the mother 23 and the father 24 is such that the mother 23 is "principal" and the father 24 is "subordinate". Furthermore, since the boy 22 and the father 24 are both in front of and overlap the man 26, the principal-subordinate relationship between the boy 22 and the man 26 is such that the boy 22 is "principal" and the man 26 is "subordinate", and the principal-subordinate relationship between the father 24 and the man 26 is such that the father 24 is "principal" and the man 26 is "subordinate". Furthermore, since the boy 22, father 24 and man 26 are in front of and overlap the bus 27, the principal-subordinate relationship between the father 24 and the bus 27 is such that the father 24 is "principal" and the bus 27 is "subordinate", and the principal-subordinate relationship between the man 26 and the bus 27 is such that the man 26 is "principal" and the bus 27 is "subordinate". Since the man 26 is inside the bus 27, the image of the man 26 is perceived as being in front of the bus 27. However, the bus 27 is perceived as being in front of a subject that is inside the bus 27, then the principal-subordinate relationship between the man 26 and the bus 27 will be such that the bus 27 is "principal" and the man 26 is "subordinate".

The principal-subordinate relationships between pairs of subjects obtained by principal-subordinate relationship decision processing regarding the image 50 are stored in the principal-subordinate relationship table shown in FIG. 8.

When principal-subordinate relationship decision processing is executed with regard to all of the images (the image 20 and the image 50) ("YES" at step 45), the CPU 2 generates a directed graph indicating the principal-subordinate relationships regarding pairs of subjects concerning all of the images (step 46).

FIG. 9 is a directed graph indicating the principal-subordinate relationships regarding pairs of subjects included in the images 20 and 50.

As will be appreciated from the principal-subordinate relationship table shown in FIG. 8, arrows point from the bus 27 to the boy 22, the father 24 and the man 26 because the bus 27 is "subordinate" to the boy 22, the father 24 and the man 26. Arrows point from the man 26 to the boy 22 and the father 24 because the man 26 is "subordinate" to the boy 22 and the father 24. Arrows point from the father 24 to the boy 22 and the mother 23 because the father 24 is "subordinate" to the boy 22 and the mother 23. An arrow points from the mother 23 to the girl 21 because the mother 23 is "subordinate" to the girl 21. Arrows point from the flowers 25 to the girl 21, the boy 22, the mother 23 and the father 24 because the flowers 25 is "subordinate" to the girl 21, the boy 22, the mother 23 and the father 24.

When the directed graph regarding the girl 21, the boy 22, the mother 23, the father 24, the flowers 25, the man 26 and the bus 27 is generated, the CPU 2 generates a link matrix L representing the link relationships of the directed graph (step 47).

FIG. 10 is an example of the link matrix L.

The link matrix L shown in FIG. 10 is such that the subjects which are the girl 21, the boy 22, the mother 23, the father 24, the flowers 25, the man 26 and the bus 27 shown in FIG. 9 are arrayed in the following order along both the row and column directions: the flowers 25, the mother 23, the girl 21, the father 24, the boy 22, the bus 27 and the man 26.

To facilitate calculation, however, the girl 21 and the boy 22, which are not "subordinate" to any of the subjects, are treated as "subordinate" with respect to all subjects other than themselves. That is, the girl 21 is taken as being "subordinate" to all of the subjects, namely the boy 22, the mother 23, the father 24, the flowers 25, the man 26 and the bus 27, with the exception of the girl 21, and the boy 22 is taken as being "subordinate" to all of the subjects, namely the girl 21, the mother 23, the father 24, the flowers 25, the man 26 and the bus 27, with the exception of the boy 22.

The elements of the link matrix L can be considered principal-subordinate relationship values obtained by quantifying the principal-subordinate relationships between pairs of subjects. In a case where two subjects are adopted as a first subject and a second subject and a principal-subordinate relationship exists between the first subject and the second subject, the principal-subordinate relationship value is the reciprocal of the number of subjects to which the first subject is a subordinate subject. In a case where a principal-subordinate relationship does not exist between the first and second subjects, the CPU 2 (principal-subordinate relationship value calculation unit) calculates zero as the principal-subordinate relationship value. That is, a probability matrix is generated in which the probabilities that a first subject is subordinate to a second subject are arrayed, with regard to all combinations of the multiple pairs of subjects included, as principal-subordinate relationship values concerning principal-subordinate relationships in which the first subject is a subordinate subject and the second subject is a principal subject. Naturally, the situation is not limited to one in which the principal-subordinate relationship value is the reciprocal of the number of subjects to which the first subject is a subordinate subject in a case where two subjects are adopted as a first subject and a second subject and a principal-subordinate relationship exists between the first and second subjects, and the principal-subordinate relationship value is zero in a case where a principal-subordinate relationship does not exist between the first and second subjects. It will suffice if the value in a case where a principal-subordinate relationship exists between the first and second subjects is greater than the value in a case where a principal-subordinate relationship does not exist between the first and second subjects and, moreover, the value in a case where a principal-subordinate relationship exists between the first and second subjects is smaller the greater the number of subjects to which the first subject is a subordinate subject.

For example, consider the two subjects which are the flowers 25 and the mother 23. The flowers 25 (first subject) is "subordinate" to the mother 23 and the mother 23 (second subject) is "principal" relative to the flowers 25. Therefore, the principal-subordinate relationship value in the principal-subordinate relationship in which the flowers 25 is "subordinate" and the mother 22 is "principal" is as follows: 1/(number of subjects to which the first subject is subordinate)=reciprocal of the number of subjects to which the first subject is subordinate=¼=0.25.

The matrix is defined such that the subject in each row is a "principal" subject in the principal-subordinate relationship with respect to the subject in each column corresponding to the row, and the subject in each column is a "subordinate" subject in the principal-subordinate relationship with respect to the subject in each row corresponding to the column. For example, the element (principal-subordinate relationship value) of the second row and first column is stipulated as being 0.25. This element is a value calculated in a case where the subject which is the mother 23 stipulated in the second row is taken as "principal" and the subject which is the flowers 25 stipulated in the first column is taken as "subordinate". The principal-subordinate relationship values regarding the other "principal" subjects, namely the girl 21, the father 24 and the boy 22, to which the flowers 25 is "subordinate" are also 0.25. Further, since there are no principal-subordinate relationships between the bus 27 and the flowers 25 and between the man 26 and the flowers 25, these elements (principal-subordinate relationship values) are zero. Further, in the principal-subordinate relationship in which the mother 23 (second subject) is "subordinate" and the girl 21 (first subject) is "principal", the number of subjects to which the girl 21 is "subordinate" is zero but in this case the element is made 1. Similarly, since the relationship between the mother 23 and the father 24 is such that the father 24 is "subordinate" and the mother 23 is "principal", the element of the second row and fourth column of the link matrix L is 0.5. Further, since the relationship between the boy 22 and the father 24 is such that the father 24 is "subordinate" and the boy 22 is "principal", the element of the fifth row and fourth column of the link matrix L is 0.5 as well. The other elements (principal-subordinate relationship values) of the link matrix L are calculated by the CPU 2 in a similar manner.

On the basis of principal-subordinate relationships decided with regard to multiple images, a link matrix L is generated by applying a principal-subordinate relationship value, which is higher in a case where a relationship in which a first subject is "subordinate" and a second subject is "principal" exists than in a case where a relationship in which the first subject is "subordinate" and the second subject is "principal" does not exist, to a principal-subordinate relationship in which the first subject is "subordinate" and the second subject is "principal". Further, in a case where a relationship in which the first subject is "subordinate" and the second subject is "principal" exists, a link matrix L is generated by applying a principal-subordinate relationship value, which is lower the greater the number of subjects, among multiple subjects, to which the first subject is "subordinate", to a principal-subordinate relationship in which the first subject is "subordinate" and the second subject is "principal".

Thus, a principal-subordinate relationship refers to a relationship that can be found by subjecting a single image to analysis to thereby specify two subjects, calculating rankings or numerical values with regard to the two subjects in accordance with a fixed criterion, and adopting the subject for which the ranking or numerical value is high as the "principal" subject and adopting the subject for which the ranking or numerical value is low as the "subordinate" subject. The fixed criterion may be any criterion that enables rankings or numerical values to be calculated with regard to two subjects. For example, the area of a single image occupied by a subject may be adopted as the criterion or, as mentioned above, the subject of two subjects that is comparatively near the center of the image may be adopted as the "principal" and the subject relatively far from the center of the image may be adopted as the "subordinate". Further, the subject of two subjects that has a relatively high saturation, lightness or image quality may be adopted as the "principal" and the subject having a relatively low saturation, lightness or image quality may be adopted as the "subordinate". By adopting such an arrangement, it is possible to apply a high evaluation value to a subject of the kind that is small in area but important in an image, and it is possible to objectively obtain an evaluation of a subject that is close to the evaluation that would be rendered based upon the aesthetic sense of a human being.

Next, a subject evaluation value matrix G is calculated by the CPU 2 (step 48).

The subject evaluation value matrix (is calculated according to the equation $G=\alpha L+(1-\alpha)A$. Here a matrix A indicates the existence of principal-subordinate relationships to the effect that all of the subjects, namely the girl 21, the boy 22, the mother 23, the father 24, the flowers 25, the man 26 and the bus 27, are "subordinates" of all subjects inclusive of the subjects themselves. The matrix A, which is illustrated in FIG. 11, has seven rows and seven columns, where seven is the number of all subjects included in the images 20 and 50. The coefficient $\alpha$ is a number between 0 and 1. The values of the subject evaluation value matrix G are obtained such that by making the coefficient $\alpha$ number close to 1, the principal-subordinate relationship nears the real principal-subordinate relationship of the subjects, and by diminishing the coefficient $\alpha$, the principal-subordinate relationship weakens relative to the real principal-subordinate relationship of the subjects. If we assume that $\alpha=0.85$ holds, the subject evaluation value matrix G will be represented by FIG. 12.

The components of the eigenvectors of the eigenvalue 1 of the subject evaluation value matrix G are calculated by the CPU 2 (subject evaluation value calculation unit) (step 49). The components of these eigenvectors are the subject evaluation values.

FIG. 13 is an example of a subject evaluation value table.

The subject evaluation values are represented in correspondence with the subjects. The CPU 2 decides that the higher a subject evaluation value, the more important the subject in the multiple images. Since the subject evaluation value of the girl 21 is the highest among the subject evaluation values of the girl 21, the boy 22, the mother 23, the father 24, the flowers 25, the man 26 and the bus 27, the CPU 2 decides that the girl 21 is the most important subject. Which subject is the important one can be decided even with regard to multiple subjects that do not exist in the same image. For example, although a principal-subordinate relationship does not exist between the two subjects which are the girl 21 and the boy 22 in the same image, the subject evaluation value of the girl 21 is higher. In the case of this embodiment, it is considered that the girl 21 is standing at the apex of a more intimate principal-subordinate relationship in the manner of the man 26 relative to the bus 27, the father 24 relative to the man 26, the mother 23 relative to the father 24, and the girl 21 relative to the mother 23. Thus, in this embodiment, by deciding the principal-subordinate relationships between subjects in each of multiple images, it is possible to find the subject actually thought to be important.

FIGS. 14 to 17 illustrate a modification.

In the relationship between the boy 22 and the father 24, the father 24 is "subordinate" to the boy 22 in both of the images 20 and 50, and in the relationship between the father 24 and the mother 23, the father 24 is "subordinate" to the mother 23 in the image 50. The number of principal-subordinate relationships between the boy 22 and the father 24 is greater than the number of principal-subordinate relationships between the father 24 and the mother 23. Thus, there is an imbalance in the numbers of principal-subordinate relationships. This imbalance in the numbers of principal-subordinate relationships is not considered in the foregoing embodiment but is taken into account in this modification.

Figures 14, 15:
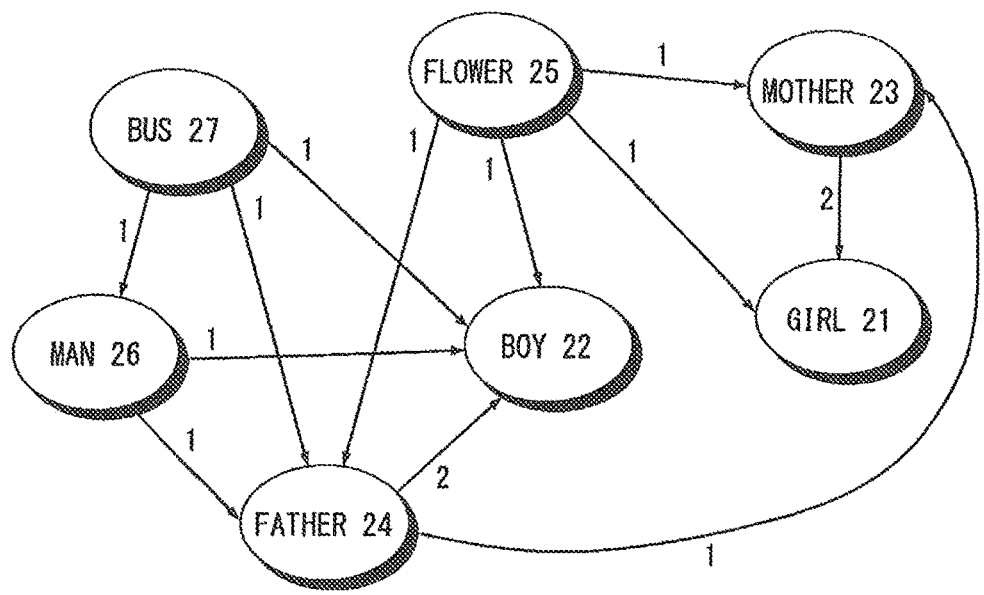
FIG. 14 is an example of a directed graph.
FIG. 15 is an example of a link matrix.

FIG. 14 is a directed graph of subjects included in the images 20 and 50 and corresponds to FIG. 9.

In the directed graph shown in FIG. 14, the numbers of images having principal-subordinate relationships in which a first subject is "subordinate" and a second image is "principal" are indicated alongside the arrows. Since the principal-subordinate relationship between the boy 22 and the father 24 in which the father 24 (first subject) is "subordinate" and the boy 22 (second subject) is "principal" exists in the two images 20 and 50, the number "2" is indicated alongside the arrow pointing from the father 24 to the boy 22. Since the principal-subordinate relationship between the father 24 and the mother 23 in which the father 24 (first subject) is "subordinate" and the mother 23 (second subject) is "principal" exists in the one image 50, the number "1" is indicated alongside the arrow pointing from the father 24 to the mother 23. The same holds true for the other principal-subordinate relationships.

FIG. 15, which corresponds to FIG. 10, illustrates link matrix L that takes an imbalance in numbers of principal-subordinate relationships into account.

In the link matrix L shown in FIG. 10, the column of the father 24 is the fourth column, and 0.5, which is the reciprocal of 2, namely the number of subjects to which the father 24 is "subordinate", has been entered for both the principal-subordinate relationship of the father 24 to the boy 22 and the principal-subordinate relationship of the father 24 to the mother 23 without attaching any superiority or inferiority. In the link matrix L shown in FIG. 15, however, 0.333 has been entered as the element of the second row and fourth column, where 0.333 is a value obtained by division by 3, which is the number of principal-subordinate relationships in which the father 24 is the subordinate subject (3 is the result of adding 2, which the number of principal-subordinate relationships between the father 24 and the boy 22, and 1, which is the number of principal-subordinate relationships between the father 24 and the mother 23). Similarly, in the link matrix L shown in FIG. 15, 0.666 has been entered as the element of the fifth row and fourth column although the number of principal-subordinate relationships between the father 24 and the boy 22 is 2. The value 0.666 is obtained by division by division by 3, which is the number of principal-subordinate relationships in which the father 24 is the subordinate subject (3 is the result of adding 2, which is the number of principal-subordinate relationships between the father 24 and the boy 22, and 1, which is the number of principal-subordinate relationships between the father 24 and the mother 23). Whereas the principal-subordinate relationship between the father 24 (first subject) and the boy 22 (second subject) exists in the two images 20 and 50, the principal-subordinate relationship between the father 24 (first subject) and the mother 23 (second subject) exists only in the one image 50. Therefore, the greater the number of images having the principal-subordinate relationship between the two subjects, the higher the principal-subordinate relationship value. The greater the number of images having a principal-subordinate relationship in which the first subject is "subordinate" and the second subject is "principal", the higher the principal-subordinate relationship value applied to the principal-subordinate relationship in which the first subject is "subordinate" and the second subject is "principal" In this way the imbalance in numbers of principal-subordinate relationships is reflected in the link matrix L. By adopting this arrangement, the larger the number of images having a principal-subordinate relationship in which a first subject is the subordinate subject and a second subject is the principal subject is in comparison with the number of images in which the first subject is the subordinate subject and another second subject is the principal subject, the higher the principal-subordinate relationship value applied to this principal-subordinate relationship and, as a result, the higher the subject evaluation value of the subject that is the principal subject. (It should be noted that although the number of images in which the mother 23 is the subordinate subject and the girl 21 is the principal subject is two, there is no subject other than the girl 21 to which the mother 23 is subordinate. Therefore, it cannot be said that a change has occurred in the imbalance in numbers of principal-subordinate relationships, and there is no change in the principal-subordinate relationship value of the principal-subordinate relationship in which the mother 23 is the subordinate subject and the girl 21 is the principal subject.)

FIG. 16 is an example of the subject evaluation value matrix G and corresponds to the subject evaluation value matrix G shown in FIG. 12.

FIG. 17 is an example of a subject evaluation value table and corresponds to the subject evaluation value table shown in FIG. 13.

The evaluation values of the subjects expressed in the subject evaluation value table shown in FIG. 15 are in the following order: the girl 21, the boy 22, the mother 23, the father 24 and the flowers 25 (the bus 27) (the flowers 25 and the bus 27 occupy the same position in the order). However, the evaluation values of the subjects expressed in the subject evaluation value table shown in FIG. 17 are in the following order: the boy 22, the girl 21, the father 24, the mother 23, the man 25 and the flowers 25 (the bus 27) (the flowers 25 and the bus 27 occupy the same position in the order). Thus it is possible to calculate subject evaluation values that correctly reflect the imbalance in numbers of principal-subordinate relationships.

FIG. 18 illustrates another example of a subject evaluation value table.

The subject evaluation value table shown in FIG. 18 contains subject evaluation values calculated, in a manner similar to that of the processing described above, with regard to images that are in addition to the images 20 and 50. The table also contains rarity evaluation values, which indicate whether a subject is rare or not, in addition to the subject evaluation values in correspondence with the subjects.

The CPU 2 (rarity evaluation value calculation unit) calculates a rarity evaluation value by dividing the subject evaluation value by the frequency of appearance of the subject. A subject having a high rarity evaluation value has a low frequency of appearance among multiple images but it gives a strong impression. For example, since a subject which is a book has a low subject evaluation value but a high rarity evaluation value, it will be appreciated that the impression given by the book is strong. Thus, a decision can be rendered to the effect that the higher a value (rarity evaluation value) obtained by dividing a subject evaluation value by the frequency of appearance of the subject in multiple images, the more important the subject.

Further, in a case where subject evaluation values and rarity evaluation values are obtained, as illustrated in FIG. 18, sum values obtained as by weighting and adding a subject evaluation value and rarity evaluation value for every subject may be calculated and used in deciding important subjects.

As many apparently widely different embodiments of the present invention can be made without departing from the spirit and scope thereof, it is to be understood that the invention is not limited to the specific embodiments thereof except as defined in the appended claims.

What is claimed is:

1. A subject evaluation system comprising:
  a processor, configured to:
  execute principal-subordinate relationship decision processing with regard to multiple images, wherein the principal-subordinate relationship decision processing decides a principal-subordinate relationship, which concerns two of the images, with regard to multiple subjects included in each of the two images, the principal-subordinate relationship being obtained by the processor evaluating two of the subjects based on a fixed criterion pertaining to the two images to calculate rankings or numerical values with regard to the two of the subjects in accordance with the fixed criterion, identifying one of the two subjects for which the ranking or numerical value is highest as a principal subject, and identifying the other one of the two subjects as a subordinate subject;

generate a link matrix representing link relationships of a directed graph showing the principal-subordinate relationship;

calculate components of eigenvectors based upon the generated link matrix;

calculate a subject evaluation value for every one of the subjects based upon the calculated components of the eigenvectors; and decide an important subject from the calculated subject evaluation value.

2. The system according to claim 1, wherein said processor calculates the principal-subordinate relationship value as a reciprocal of the number of the subjects to which the first subject is subordinate in a case where a relationship in which the first subject is a subordinate subject and the second subject is a principal subject exists, and calculates the principal-subordinate relationship value as being zero in a case where a relationship in which the first subject is a subordinate subject and the second subject is a principal subject does not exist.

3. The system according to claim 1, wherein in a case where two subjects overlap, the principal-subordinate relationship decision processing in said processor adopts whichever subject is in front as a principal subject and whichever subject is in back is a subordinate subject.

4. The system according to claim 1, wherein in a case where two subjects are spaced away from each other, the principal-subordinate relationship decision processing in said processor foregoes deciding a principal-subordinate relationship.

5. The system according to claim 1, wherein the principal-subordinate relationship decision processing in said processor assumes that of two subjects, a subject relatively close to the center of the image is a principal subject and a subject relatively far from the center of the image is a subordinate subject.

6. The system according to claim 1, wherein the principal-subordinate relationship decision processing in said processor assumes that of two subjects, a subject having a relatively high saturation, lightness or image quality is a principal subject and a subject having a relatively low saturation, lightness or image quality is a subordinate subject.

7. The system according to claim 1, wherein the greater the number of images having a principal-subordinate relationship in which the first subject is a subordinate subject and the second subject is a principal subject, the higher principal-subordinate relationship value that said processor applies to a principal-subordinate relationship in which the first subject is a subordinate subject and the second subject is a principal subject.

8. The system according to claim 1, wherein said processor is further configured to calculate subject rarities obtained by dividing the subject evaluation values, which have been calculated by said processor, by respective ones of frequencies of appearance of subjects in the multiple images.

9. The system according to claim 1, wherein the subjects are decided from tags that have been appended to the images.

10. The system according to claim 1, wherein the each image is analyzed by the processor and the principle-subordinate relationship is decided with regard to the multiple subjects included in the each image.

11. The system according to claim 1, wherein when two subjects do not overlap, no principle-subordinate relationship involving the two subjects is decided.

12. The system according to claim 1, wherein which subject is the important one can be decided with regard to multiple subjects that do not exist in the same image.

13. A subject evaluation method comprising:

executing, by a processor, principal-subordinate relationship decision processing with regard to multiple images, wherein the principal-subordinate relationship decision processing decides a principal-subordinate relationship, which concerns two of the images, with regard to multiple subjects included in each of the two images, the principal-subordinate relationship being obtained by the processor evaluating two of the subjects based on a fixed criterion pertaining to the two images to calculate rankings or numerical values with regard to the two of the subjects in accordance with the fixed criterion, identifying one of the two subjects for which the ranking or numerical value is highest as a principal subject, and identifying the other one of the two subjects as a subordinate subject;

generating, by the processor, a link matrix representing link relationships of a directed graph showing the principal-subordinate relationship;

calculating, by the processor, components of eigenvectors based upon the generated link matrix;

calculating, by the processor, a subject evaluation value for every one of the subjects based upon the calculated components of the eigenvectors; and deciding, by the processor, an important subject from the calculated subject evaluation value.

14. A non-transitory recording medium storing a computer-readable program for controlling a computer of a subject evaluation system so as to:

execute principal-subordinate relationship decision processing with regard to multiple images, wherein the principal-subordinate relationship decision processing decides a principal-subordinate relationship, which concerns two of the images, with regard to multiple subjects included in each of the two images, the principal-subordinate relationship being obtained by the processor evaluating two of the subjects based on a fixed criterion pertaining to the two images to calculate rankings or numerical values with regard to the two of the subjects in accordance with the fixed criterion, identifying one of the two subjects for which the ranking or numerical value is highest as a principal subject, and identifying the other one of the two subjects as a subordinate subject;

generate a link matrix representing link relationships of a directed graph showing the principal-subordinate relationship;

calculate components of eigenvectors based upon the generated link matrix;

calculate a subject evaluation value for every one of the subjects based upon the calculated components of the eigenvectors; and decide an important subject from the calculated subject evaluation value.

\* \* \* \* \*